INVENTOR
William A. Palmer
BY Fleh[illegible] Swain
Attorneys

INVENTOR
William A. Palmer
BY [signature]
Attorneys 3,402,261

VIDEO RECORDING WITH LAP-DISSOLVE FILMING OF INTERLACED TELEVISION FIELDS

William A. Palmer, Menlo Park, Calif., assignor to W. A. Palmer Films, Inc., San Francisco, Calif., a corporation of California Filed Dec. 11, 1964, Ser. No. 417,549
12 Claims. (Cl. 178—7.4)

ABSTRACT OF THE DISCLOSURE

Video recording camera having an in-front-of-the-lens shutter with at least one crescent-shaped opening to provide a lap-dissolve of an interlaced video image extending over a substantial angle.

This invention relates to a video recording camera and more particularly to a video recording camera for photographing images from a video screen.

In Patent No. 2,809,234, there is disclosed a video recording camera for photographing video screen images and which discloses the use of a shutter at or near the optical center of an optical system to make use of a resulting gradual fade-in and fade-out of the image on the film to perform a "picture splice" which extends over a number of video lines to thereby eliminate the critical joining of two television scans in a "picture splice" which often results in "shutter bar" in the video recordings.

As described in Patent No. 2,809,234, the standard television picture in the United States is displayed at a rate which is comparable to 30 frames per second because it is comprised of 525 horizontal lines repeated thirty times per second. The scanning sequence, when viewing the subjects from the pick-up or monitor tube, is from left to right along these horizontal lines, and from top to bottom. Interlaced scanning is employed in which the spot starts from the upper left-hand corner and in $\frac{1}{60}$ of a second scans every other line in travelling to the bottom of the picture and returning. These 262.5 lines which have been scanned in the initial traverse are called the first field. On the next traverse of the spot from the top to the bottom, the other 262.5 lines are scanned. This constitutes the second field and when the two fields are taken together, they represent a frame of 525 lines repeated thirty times per second.

The standard projection rate for the sound motion picture industry in the United States is normally 24 frames per second. As explained in Patent No. 2,809,234, a problem is created in obtaining 24 motion picture frames per second from a television picture which is repeated thirty times per second. Because of this difference in frame rate, it is possible for the video recording cameras to expose each motion picture frame to one television frame (two fields each representing $\frac{1}{60}$ of a second), while still leaving $\frac{1}{120}$ of a second $$\left(\frac{1}{24}-\frac{1}{30}=\frac{1}{120}\right)$$

for shutter closing, film pull-down and shutter opening. As explained above, Patent No. 2,809,234 discloses a video recording camera in which it is possible to eliminate "shutter bar" that is caused by the making of an imperfect picture splice arising from the combining of imperfectly the upper one-half of one television field with the lower one-half of another television field by causing a gradual fade-in and fade-out of the image on the film to thereby provide a picture splice which extends over a relatively large number of video lines.

In making video recordings utilizing other standards, additional problems are encountered. For example, in European countries, the standard television picture is projected at a rate which is comparable to 25 frames per second and motion pictures are also projected at the rate of 25 frames per second so they are compatible with the television projection rate. However, it can be seen that with such standards, additional problems are posed in making video recordings because it is necessary to record every television frame which theoretically only leaves the blanking period after every other field for film pull-down and shutter opening and closing. In European countries, it has been the practice, in order to obtain the necessary time to pull the film down and open and close the shutter, to only record every other field or, in other words, one field of every television frame so that, in effect, the video recording camera is opening and closing the shutter and pulling the film down during 50 percent of the time and during the other 50 percent of time is recording the television field. However, it has been found that with such a system, it is necessary to utilize very precise phasing so that the recording of one field is started at the start of the scan and is stopped at the end of the scan to obtain a complete picture without interlace. Attempts have been made to overcome this very precise phasing problem by utilizing a kinescope with a long persistence phosphor to retain the interlace. This, however, has not been completely satisfactory. It, therefore, can be seen that there is a need for a new and improved video recording camera.

In general, it is an object of the present invention to provide a new and improved video recording camera which overcomes the above named difficulties.

Another object of the invention is to provide a video recording camera which is particularly useful for making recordings from 50 cycle, 25 frame television systems.

Another object of the invention is to provide a video recording camera of the above character which is also useful for making recordings from other systems as, for example, 60 cycle, 24 frame television systems.

Another object of the invention is to provide a video recording camera of the above character which makes possible the recording of a substantially interlaced picture.

Another object of the invention is to provide a video recording camera of the above character in which synchronizing and phasing to the television system is not critical.

Another object of the invention is to provide a video recording camera of the above character which can be utilized for recording images from various sources operating on different power supplies at distant locations.

Another object of the invention is to provide a video recording camera of the above character which is relatively simple and which can be economically manufactured.

Additional objects and features of the invention will appear from the following description in which the preferred embodiments are set forth in detail in conjunction with the accompanying drawings.

Referring to the drawings.

Figure 1:
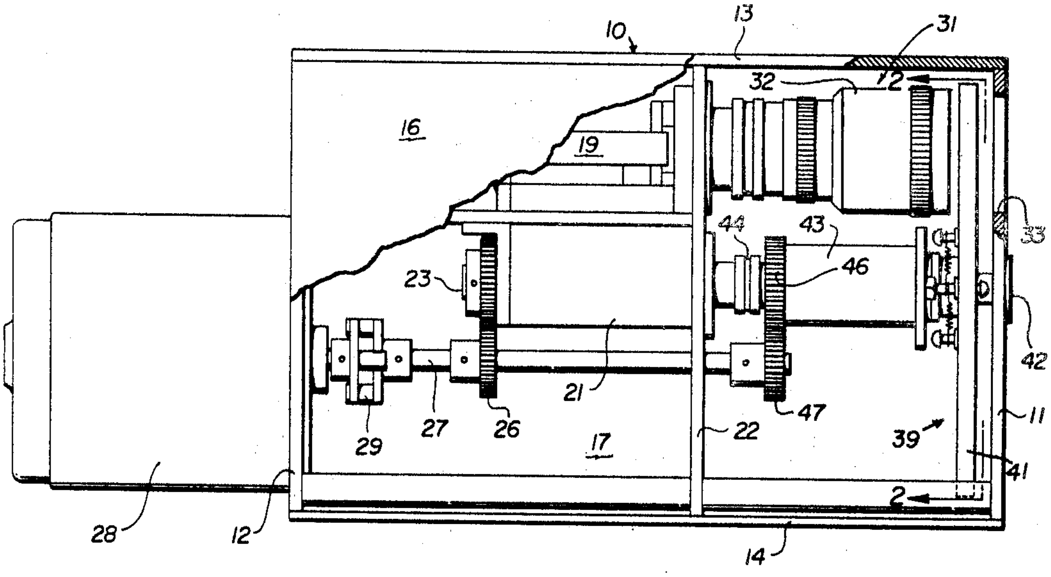
FIGURE 1 is a plan view of a video recording camera incorporating the present invention with a portion of the enclosure broken away.

In general, the camera for recording or photographing video images consists of means for moving film through an exposure zone. An optical system is provided for projecting and focusing the light from the video images onto the film in the exposure zone. Means is also provided defining a lens aperture in the optical system. Shutter means cooperates with the aperture and is effectively positioned at the optical center of the optical system on the object side thereof. The shutter means includes an opaque circular plate which has at least one opening therein. The opening is formed so that opening and closing of the shutter with respect to the aperture is substantially 180° apart and provides a lap-dissolve of an interlaced video image extending over substantially 180°.

As shown in the drawings, the video recording camera consists of a case or housing 10 which is provided with front and rear walls 11 and 12, side walls 13 and 14, and top and bottom walls 16 and 17.

Means is provided within the case 11 for advancing a suitable recording medium such as the film 19 and consists of a film transport assembly 21 of a conventional type which is mounted on a vertical wall 22 provided within the case 10. The film transport assembly 21 includes a shaft 23 which has a spur gear 24 mounted thereon. The spur gear 24 is driven by another spur gear 26 affixed to a shaft 27 rotatably mounted in the wall 22. The shaft 27 is driven by a motor 28 mounted on the rear wall 12 through a flexible coupling 29 connected to the motor output shaft and the shaft 27.

The film transport assembly 21 is of a conventional type and serves to advance the film 19 through an exposure zone at the desired intermittent speed as, for example, at 24 frames per second as is standard for sound motion picture industry or at 25 frames per second as is standard with many European countries for sound motion picture recording.

An optical system is mounted within the case 10 and is provided for projecting and focusing the light from the video images to be recorded onto the film 19 in the exposure zone and consists of a lens assembly 32 also of a conventional type as, for example, a 2 inch "Kodak" Anastigmat *f*/1.6. The lens assembly 44 is mounted on the interior vertical wall 22 provided within the case and faces forwardly to receive light from the video images through an opening 33 provided in the front wall 11.

The optical system 31 also includes means defining a lens aperture 34 which is in the form of a truncated sector. The aperture is formed by a coating 36 of an opaque material on the outer lens of the lens assembly 32. Alternatively, if desired, an opaque shield of a suitable material such as metal or plastic can also be placed in the lens assembly in front of the outer lens to provide the desired aperture.

Shutter means in the form of a shutter assembly 39 is provided within the case which cooperates with the aperture and is effectively positioned at or near the optical center of the optical system on the object side thereof. The shutter assembly 39 includes an opaque circular plate 41 which serves as a shutter. It is formed of suitable material such as aluminum and is disposed in front of the lens assembly 32 at or very near to the optical center of the lens assembly 32 on the object side of the lens assembly. The circular plate 41 is mounted upon the shaft 42 and is driven thereby. The circular plate 41 can be mounted on the shaft 42 in any suitable manner such as the manner in which the shutter is mounted in the video recording camera shown in U.S. Letters Patent 2,809,234 to isolate the circular plate 41 from any vibration carried by the shaft 42. The shaft 42 is rotatably mounted in the front wall 11 and is secured to a sleeve 43. The sleeve 43 is rotatably mounted in a thrust bearing 44 carried by the vertical wall 22. A spur gear 46 is mounted on the sleeve 43 and is driven by another spur gear 47 mounted on the shaft 27 which extends through the vertical wall 22.

Figure 2:
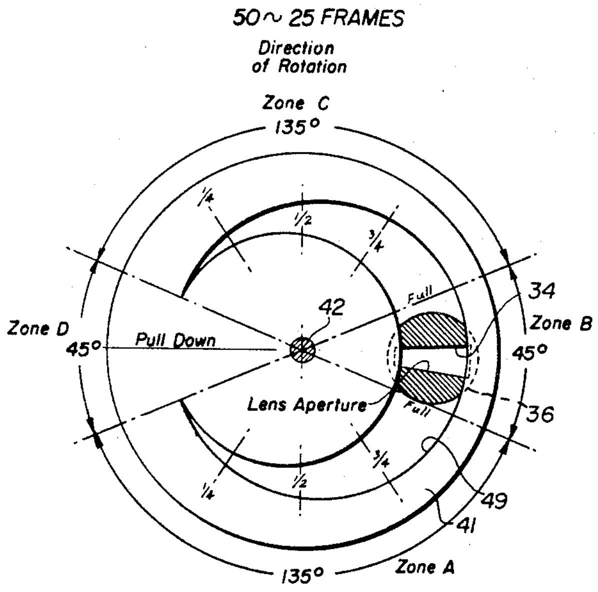
FIGURE 2 is a view taken along the line 2—2 of FIGURE 1.

The circular plate 41 forming a part of the shutter assembly 39 is provided with at least one symmetrical opening 49 which cooperates with the aperture 34 and which is formed so that opening and closing of the shutter are substantially 180° apart and to provide a lap-dissolve of an interlaced video image on the film extending over substantially 180°. As can be seen from FIGURE 2, the opening 49 is in the form of a crescent. As also shown in FIGURE 2, the 360° of the circular plate 41 are divided into four separate zones which are identified as zone A, zone B, zone C and zone D. Assuming that the shutter is rotating in a clockwise direction as viewed in FIGURE 2, zone A can be considered to be the zone where the shutter is opened or, in other words, in which the shutter is moved from a fully closed position in which no part of the video image can pass onto the film 19 to a fully open position in which all portions of the film in the exposure zone are exposed to the light from the video image. In other words, zone A is a zone in which the shutter is opened in a linear manner. The second zone, zone B, is a zone in which the aperture is open or, in other words, the shutter remains fully open. The third zone, zone C, is one in which the shutter is moved from a fully open position to a fully closed position in a linear manner to provide the exact complement of what is occurring in zone A. The fourth zone, zone D, is a zone in which the shutter remains completely closed or, in other words, the aperture is closed during which time film pull-down takes place. The function of zones A and C, when combined, is to perform what may be called a "lap dissolving field."

The crescent-shaped opening 49 is shaped so that its extreme ends extend circumferentially from the center of the aperture 34 and increase linearly in width through zones A and C until they have a width which is equal to the height of the aperture 34. A similar linear opening and closing of the aperture can be obtained by crescent-shaped openings which extend from the top or bottom of the aperture and which increase or decrease in width through zones A and C until reaching the opposite side of the aperture. The embodiments shown in FIGURE 1 is, however, preferred, since the opening and closing occur at the center of the lens where the optical resolution is the best.

As can be seen from FIGURE 2, zones A and C have been indicated as subtending 135° each, whereas zones B and D have been indicated as subtending 45° each. The number of degrees in the four zones of the shutter plate 41 can be varied depending upon the amount of time required for the pull-down. It is only very desirable that the opening and closing zones, that is, zones A and C, be spaced precisely 180° apart so as to achieved uniform exposure on each motion picture frame on the film 19 regardless of the phasing between the film transport mechanism and the television blanking period. With such an arrangement, a lens aperture subtending approximately 10° has been found to be very satisfactory.

As will be noted from FIGURE 2, zones A and C also have been divided into four different areas indicating the ¼, ½, ¾ and full positions of the shutter 41 with respect to the lens aperture 34.

Figure 3:
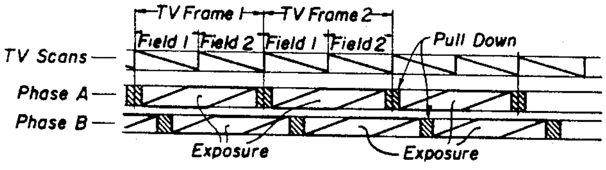
FIGURE 3 is a graphic illustration of the timing sequence between the television scans and the video recording with the shutter shown in FIGURE 2 in two possible phasing positions.

Operation of the video recording camera herein disclosed may now be briefly described as follows. Let it be assumed that it is desired to record video images which are being projected at the rate of 25 television frames (2 fields for each frame) and that it is also desired to record these video images on motion picture film at the rate of 25 frames per second. The exposure of the motion picture frames in relation to the scanning of the television frames consisting of two fields each is illustrated in FIGURE 3 and shows two possible phase relations between the television scanning and the motion picture recording. As shown in FIGURE 3, the television scans are represented by field 1 and field 2 in which every two fields comprises a single television frame. As can be seen from the phase A and phase B of FIGURE 3, the phasing of the shutter cycle with respect to the television scanning is immaterial because an inspection of these diagrams shows that each motion picture frame receives the same exposure in all parts of the frame regardless of the phase. This is because the opening and closing of the shutter are exactly complementary and are 180° apart so as to provide a lap-dissolve of an interlaced video image extending over substantially more than 180°. The use of a phosphor of moderate persistence fills in to give substantially uniform raster.

With the arrangement shown in FIGURES 1 and 2, it can be seen that it is possible to provide excellent video recordings at the 25 frame rate from television scans being displayed at the rate of 25 frames per second. There is adequate time for film pull-down without sacrifice of quality of the picture being recorded on the film.

Thus, it can be seen that my video recording camera makes it possible to record a substantially interlaced picture while being noncritical in synchronization and phasing to the television system. Therefore, video recordings can be made where a video recording camera is driven from a different power source than the source of power for the TV system.

Although the video recording camera shown in FIGURES 1 and 2 has been disclosed as being used for recording on film at the rate of 25 frames per second from video images being projected at the 25 frame rate, it is readily apparent that a similar video recording camera can be utilized for recording at a 24 frame rate from video images also being displayed at a 48 cycle 24 frame rate as in certain closed circuit applications.

Figures 4, 6, 8:
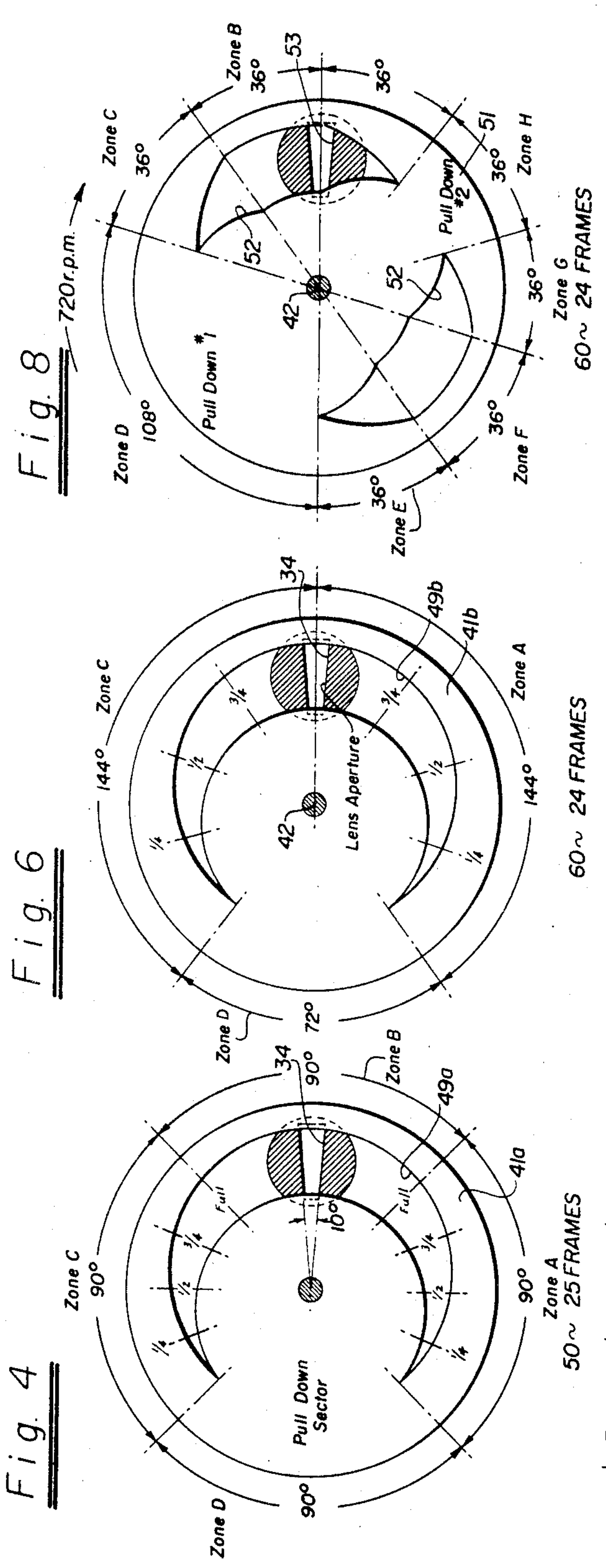
FIGURE 4 is a view similar to FIGURE 2 showing another embodiment of a shutter for use in the video recording camera shown in FIGURE 1.
FIGURE 6 is a view similar to FIGURE 2 and shows still another embodiment of a shutter for use in the ivdeo recording camera shown in FIGURE 1.
FIGURE 8 is a view similar to FIGURE 2 and shows still another embodiment of a shutter for use in the video recording camera shown in FIGURE 1.
Figure 5:
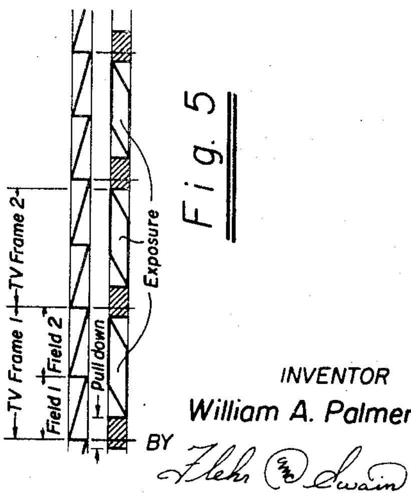
FIGURE 5 is a graphic illustration of the timing sequence between the television scans and the video recording using the shutter shown in FIGURE 4.

As pointed out previously, the opening 49 provided in the shutter plate 41 can be changed so that the zones A, B, C and D subtend different angles from that shown in FIGURE 2. Thus, for example, as shown in FIGURE 4, the shutter plate **41*a* is provided with an opening 49*a* which again is crescent-shaped but which extends through a smaller angle. Thus, as shown, the zones A, B, C and D subtend equal angles of 90° each. Such an arrangement provides greater time for a pull-down. With such an arrangement as shown in FIGURE 5, a complementary opening and closing (180° apart) of the aperture 34 by the shutter plate 41*a***. However, it should be pointed out that, in general, it is preferable to utilize as short a pull-down time as possible because this makes it possible to spread the lap-dissolve over a greater period of time, and for that reason, the amount of information recorded from the projected video image is greater. As can be seen, at least some part of the projected video image is being recorded during the entire scanning period of the two fields except during the pull-down period. Thus, if the pull-down period is kept as short as 45° as shown in FIGURE 2 and the kinescope on which the video image is being projected has a relatively long decay phosphor, the video image recorded on the film will have no flicker or banding and the interlace between the scans or fields will be substantially complete to thereby provide video recordings of excellent quality.

Still another embodiment of the video recording camera is shown in FIGURE 6 which is particularly useful in making film recordings at the rate of 24 frames per second from video images being projected at a rate of 30 frames per second. Again, an opening **49*b* provided in the shutter plate 41*b*** is crescent-shaped. Three zones A, C and D are provided in which zones A and C subtend 144° each and zone D subtends 72°. During zone A, the aperture is being opened, whereas during zone C, the aperture is being closed. During zone D, the pull-down of the film is taking place.

Figure 7:
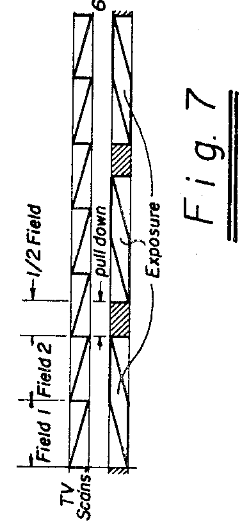
FIGURE 7 is a graphic illustration of the timing sequence between the television scans and the video recording using the shutter shown in FIGURE 6.

With the shutter assembly shown in FIGURE 6, the exposure on the film is one continuous lap-dissolve occupying the complete time of one video frame or 1/30 of a second. However, since the opening and closing of the aperture is gradual and linear and the opening and closing are exactly complementary, the exposure may start at any point in the TV scan without causing "shutter bar." As can be seen from FIGURE 7, the start of every other motion picture frame is at the same point in the TV scanning cycle, but successive motion picture frames will start at different points on the TV cycle located one-half a field apart in time.

Thus, it can be seen that the video recording camera herein disclosed can also be utilized for making recordings where the video image display rate is greater than the rate at which the image is being recorded.

In the embodiment shown in FIGURE 6, the shutter plate **41*b* is rotating at a speed of 1440 revolutions per minute, that is, at one revolution every motion picture frame. Still another embodiment of the video recording camera is shown in FIGURE 8 in which a circular shutter plate 51 is provided which is mounted on the shaft 42. Assuming that the video recording camera is to be utilized for recording video images being projected at the rate of 30 frames per second, the speed of the shutter is one-half the speed of the shutter shown in FIGURE 6 or, in other words, at 720 r.p.m. or one revolution every two motion picture frames. The shutter plate 51 is divided into eight zones A–H in which all the zones except zone D subtend an angle of 36°. Zone D subtends an angle of 108° and can be identified as the zone in which pull-down 1 occurs and zone H can be identified as the zone in which pull-down 2 occurs. In this embodiment of the invention, the lens aperture 53 has been narrowed to approximately 5°. The openings 52 are formed so that zone A performs a linear opening of the lens aperture 53 during 36° rotation of the shutter plate 51. Zone B leaves the aperture fully open for 36° and zone C performs a linear closing complementary to the opening formed by zone A in 36°. In zone D, the aperture is closed through 108° during which time the film pull-down occurs. The other opening 52 is formed so that zone E performs a linear opening of the lens aperture 53 through 36°. The opening 52** is also formed in zone F, the lens aperture is open for 36° and so that in zone G, the aperture is linearly closed through 36°. In zone H, the aperture is closed and the second pull-down occurs.

It should be noted that since the shutter is running at one-half the speed, one revolution for every two television frames, the degrees indicated in fact are the equivalent of twice the number of degrees on the shutter running at one turn per frame or, in other words, 1440 revolutions per minute.

Figure 9:
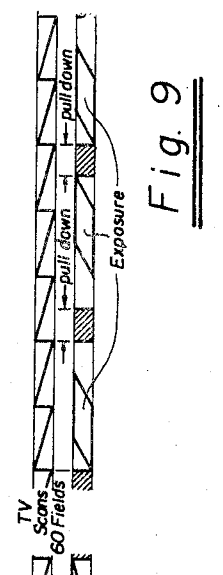
FIGURE 9 is a graphic illustration of the timing sequence between the television scans and the video recording using a shutter of the type shown in FIGURE 8.

The unsymmetrical arrangement of the openings 52 on the shutter plate 51 serve to make successive exposures of successive motion picture frames irregular in time, but so that the exposure of each motion picture frame starts at the same point of a TV scan as can be seen from FIGURE 9. Such an arrangement has the virtue of permitting relatively longer pull-down time and at the same time giving an identical exposure to each motion picture frame regardless of the phasing of the video recording camera with respect to the television system. The motion picture frame has three half fields involved in which two are included in the lap-dissolve action and in which one-half field receives a uniform exposure.

It is apparent from the foregoing that there is provided a new and improved video recording camera which is particularly adapted for recording video images which are being displayed at the same rate at which they are to be recorded on film and that, in addition, a video recording camera can be utilized for making recordings where the video image frame projection rate is greater than the rate at which frames are to be recorded. All of the embodiments record a substantially interlaced video image which is free of shutter bar and which has no flicker or banding. In all the embodiments, the opening in the shutter resembles a crescent. The shutter revolves adjacent the aperture which is placed immediately in front of the lens. In addition, the video recording camera is relatively easy to construct and can make recordings independent of phasing.

I claim:

1. In a camera for photographing video images, means for moving film through an exposure zone, an optical system for projecting and focusing light from the video images onto the film in said zone, means defining a lens aperture in said optical system, and shutter means cooperating with said aperture and effectively positioned at or near the optical center of the optical system on the object side thereof, said shutter means including an opaque substantially circular plate having at least one symmetrical opening therein, said opening being formed so that opening and closing of the aperture are substantially complementary to provide a lap-dissolve of an interlaced video image extending over an angle which is substantially greater than 72°.

2. A camera as in claim 1 wherein said opening and closing of the aperture are spaced 180° apart in phase.

3. A camera as in claim 1 wherein said circular plate is provided with two spaced symmetrical generally crescent-shaped openings.

4. A camera as in claim 1 in which the shutter plate has at least three zones, a first zone in which the shutter plate moves from a position in which the aperture is fully open to a position in which the aperture is fully closed, a second zone in which the aperture remains closed for film pull-down and a third zone in which the shutter plate moves from a position in which the aperture is closed to a position in which the aperture is fully open.

5. A camera as in claim 4 in which the aperture and the opening in the shutter plate are formed so that the opening and closing are substantially linear.

6. A camera as in claim 1 wherein said lap-dissolve extends over substantially 180°.

7. In a camera for photographing video images, means for moving film through an exposure zone, an optical system for projecting and focusing light from the video images onto the film in said zone, means defining a lens aperture in said optical system, and shutter means cooperating with said aperture and effectively positioned at or near the optical center of the optical system on the object side thereof, said shutter means including an opaque substantially circular plate having at least one symmetrical crescent-shaped opening therein, said opening being formed so that opening and closing of the aperture are substantially complementary to provide a lap-dissolve of an interlaced video image extending over a substantial angle.

8. A camera as in claim 7 wherein the crescent-shaped opening has pointed ends which are circumferentially aligned with the center of the aperture.

9. A camera as in claim 7 wherein said crescent-shaped opening extends through substantially less than 360°.

10. A camera as in claim 7 wherein said crescent-shaped opening extends through substantially 315°.

11. A camera as in claim 7 wherein said crescent-shaped opening extends through substantially 270°.

12. A camera as in claim 7 wherein said crescent-shaped opening extendings through substantially 288°.

References Cited

UNITED STATES PATENTS

| | | | |
|---|---|---|---|
| 2,809,234 | 10/1957 | Palmer | 178—7.4 |
| 2,928,895 | 3/1960 | Day | 178—7.4 |
| 3,205,304 | 9/1965 | Taesler | 178—7.4 |

ROBERT L. GRIFFIN, *Primary Examiner.*

H. W. BRITTON, *Assistant Examiner.*